I. LONG.
Wheel-Cultivator.
No. 21,428. Patented Sept. 7, 1858.
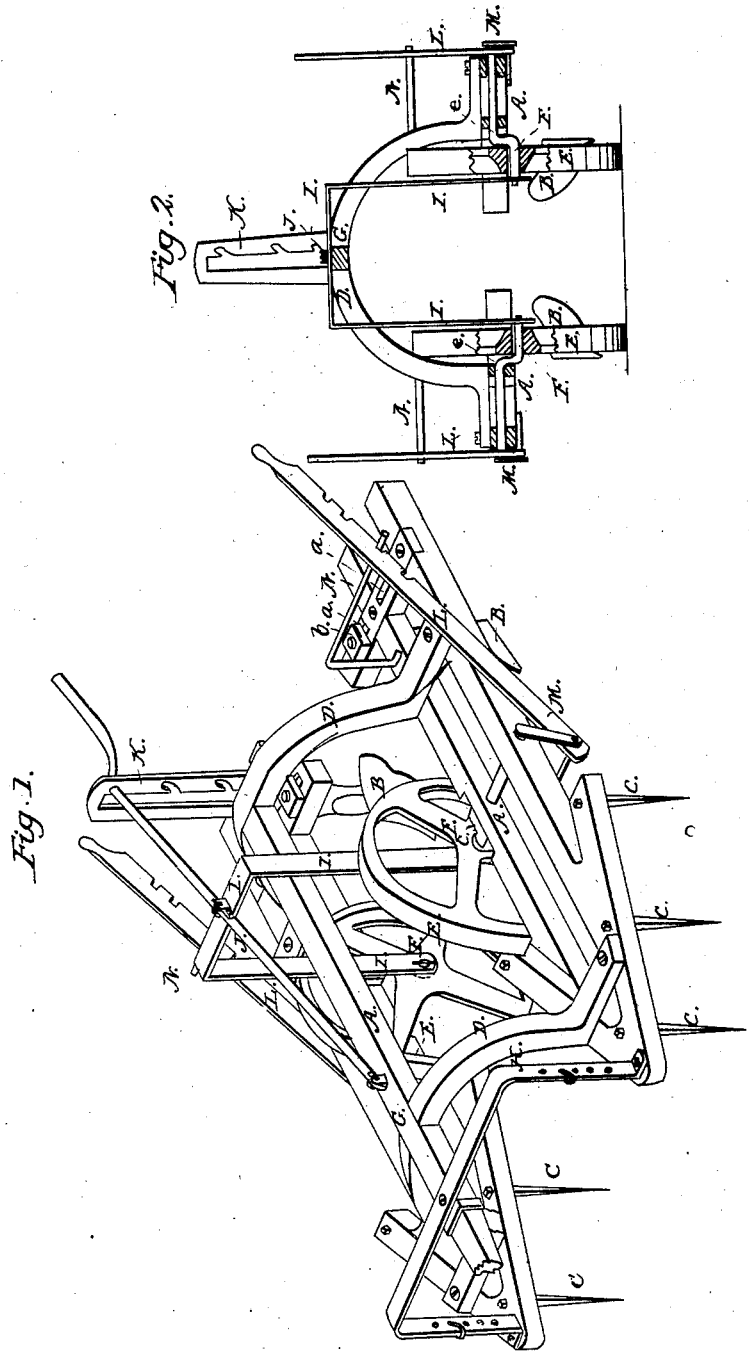

UNITED STATES PATENT OFFICE.

ISRAEL LONG, OF TERRE HAUTE, INDIANA.

IMPROVEMENT IN CULTIVATORS.

Specification forming part of Letters Patent No. 21,428, dated September 7, 1858.

*To all whom it may concern:*

Be it known that I, ISRAEL LONG, of Terre Haute, in the county of Vigo and State of Indiana, have invented a new and useful Improvement in Cultivators; and I do hereby declare that the following is a full, clear, and exact description of the same, reference being had to the accompanying drawings, forming a part of this specification, in which—

Figure 1 is a perspective view of a cultivator with my improvements applied to it. Fig. 2 is a vertical transverse section of the same.

Similar letters of reference in each of the several figures indicate corresponding parts.

The nature of my invention consists in the employment of two frames, which are furnished with harrow-teeth at their forward end and cultivator-teeth at their rear ends, and connected by arch-braces, in combination with the propelling-wheels arranged on short crank-axles, the tongue arranged on top of the arch-braces, and with the adjusting arrangements hereinafter specified, the whole being for the purposes presently set forth.

To enable others skilled in the art to make and use my invention, I will proceed to describe its construction and operation.

A A represent two frames, which have straight sides for a portion of their length, and are of V or similar form at their front ends, as shown. On the rear part of these frames cultivator-teeth B B are arranged, and on the front part harrow-teeth C C are provided. The cultivator-teeth are attached by having their shanks passed up through transverse slots *a a*, and confined in place by nuts *b b*, screwed on the upper ends of the shanks. Two sets of slots are provided, so that the teeth may be set nearer together or farther apart, as desired. The cultivator-teeth are shown as arranged to throw the soil toward the corn. By substituting those teeth on the left frame for those on the right frame the soil will be thrown from the corn. The harrow-teeth are arranged to precede the cultivator-teeth, in order that the soil may be lightened up and harrowed before being thrown up against the corn. This is considered quite essential for the promotion of the growth of the corn. The two combined harrow and cultivator frames are united by arch-shaped braces D D, and the propelling-wheels E are arranged loosely on short axles F, which do not extend from one frame to the other, in order that the tops of the short corn, which this machine is designed especially for cultivating, may be passed over without being injured; and the axles F F of the propelling-wheels are made to form cranks *c c*, in order that the frames may be raised to any extent desired above the soil while the wheels are resting upon the soil.

G is the tongue, to which the double team is attached. This tongue is arranged on the top of the arch-braces D D, so as to stand above the tops of the young corn, and thus not injure the same.

H is the equivalent of an ordinary clevis for regulating the draft of the team. By raising and lowering the tug chains or straps the draft can be regulated as desired.

I is a three-sided stop. It projects up from the inner end of each of the short axles, and extends across the reach of the tongue, as shown.

J is a pivoted lever, attached to the beam and to the top of the strap I.

K is a stop-bar. With this arrangement, by depressing the lever from the upper to the second or third notch of the bar K the strap will be caused to turn the crank-axles of the propelling-wheels, and, owing to said axles being free to turn independently of said wheels, the frame and its teeth will be raised above the surface of the ground or out of operative position. Whether the machine is in operative condition or not, the adjusting-lever must be in contact with one of the notches of the stop-bar.

L L are side adjusting-bars, and M M auxiliary cranks, formed on the outer ends of the short axles for said bars to attach to; N N, stops for the notches of the side adjusting-bars to catch against when it is desired to hold the frame in or out of operative position. With this arrangement of side bars, which I use as a substitute for the stop I, lever J, and bar K, either or both of the combined cultivator-frames may be elevated out of operative position.

This machine is very simple and compact, and conveniently managed. It is also well adapted for cultivating young corn, as it does not at all disturb or break down the corn, and perfectly harrows and lightens up the soil before throwing it up against the corn.

What I claim as my invention, and desire to secure by Letters Patent, is—

The employment of two frames, A A, which are furnished with harrow-teeth C at their forward end and cultivator-teeth B at their rear ends, and connected by arch-braces D D, in combination with the propelling-wheels E, arranged on short crank-axles c, the tongue G, arranged on top of the arch-braces, and with the adjusting arrangements, substantially as and for the purposes set forth.

The above specification of my improvement in cultivators signed by me this 4th day of August, 1858.

ISRAEL LONG.

Witnesses:
D. S. DONALDSON,
WM. D. GOSSETT.